(No Model.) 2 Sheets—Sheet 1.
J. F. SHEAHAN.
MOTOR REGULATOR.
No. 524,615. Patented Aug. 14, 1894.
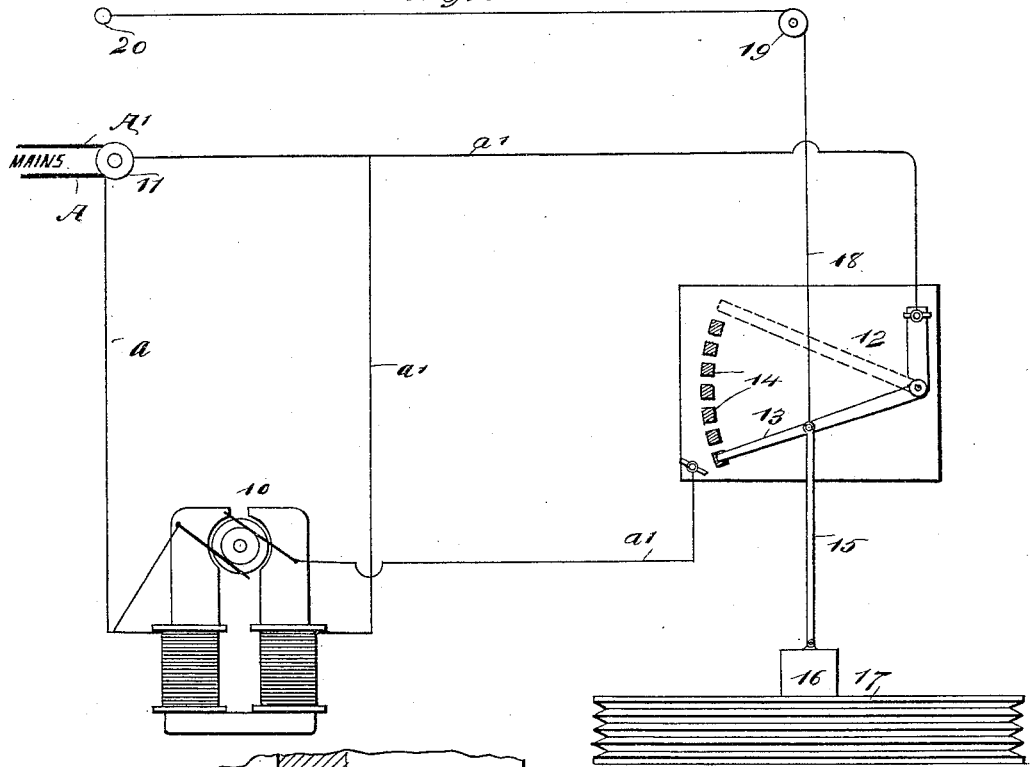
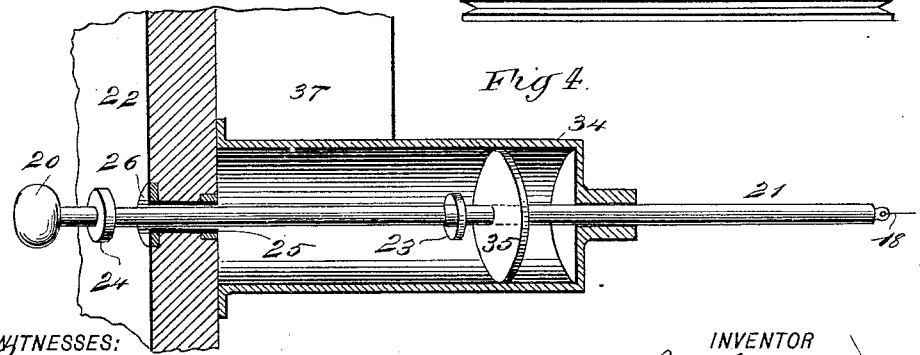
WITNESSES:
Paul Johok
W. B. Hutchinson
INVENTOR
J. F. Sheahan
BY
Munn & Co.
ATTORNEYS.

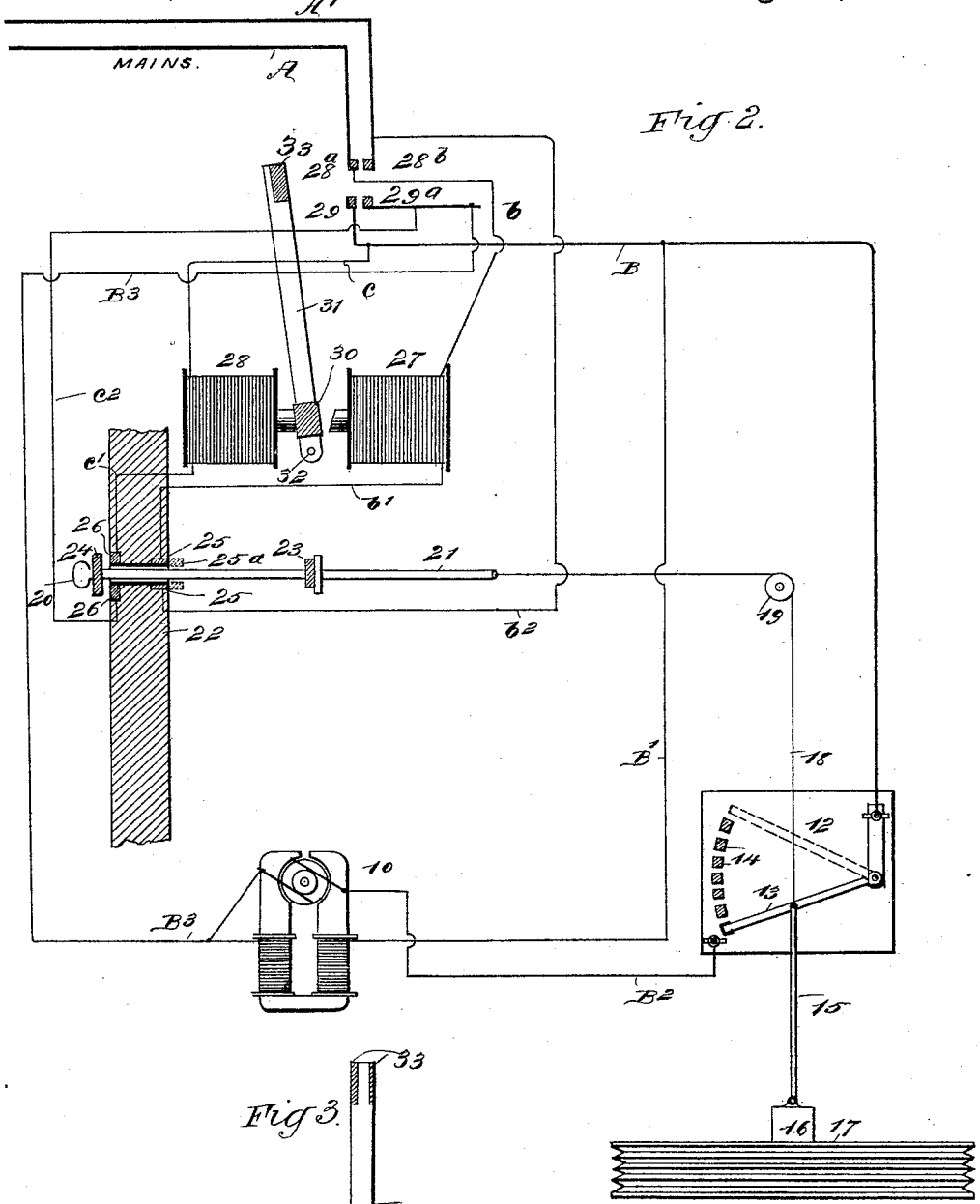

UNITED STATES PATENT OFFICE.

JOSEPH F. SHEAHAN, OF NEW YORK, N. Y.

MOTOR-REGULATOR.

SPECIFICATION forming part of Letters Patent No. 524,615, dated August 14, 1894.

Application filed May 28, 1894. Serial No. 512,632. (No model.)

*To all whom it may concern:*

Be it known that I, JOSEPH F. SHEAHAN, of New York city, in the county and State of New York, have invented a new and Improved Motor-Regulator, of which the following is a full, clear, and exact description.

My invention relates to improvements in that class of mechanism which is used for regulating the speed of electric motors and particularly to means for regulating motors used in operating organ bellows. It is necessary to regulate such motors so that they will run at a variable speed, the motor running at a decreasing speed while the bellows is filling, and stopping or nearly stopping when the bellows is full, while the motor must reach its full speed when the bellows is almost empty. In connection with devices of this kind a rheostat is usually employed which governs the current of the motor and which is regulated by the movement of the bellows, but as this rheostat is usually at some distance from the organ a second rheostat or starting box is also employed, this being arranged to turn on the necessary current to the first rheostat and motor.

The object of my invention is to do away with the second rheostat and provide an extremely simple means by which the motor regulating rheostat may be operated from the organ loft or any convenient place, also to dispense with the customary switch and provide means for switching the necessary current to the field of the motor before the current is sent through the rheostat and to the armature, so as to start the motor; to provide means for preventing the too sudden movement of the switch rod and the too sudden starting of the motor, and in a general way to produce the simplest possible means for perfectly regulating the motor and causing it to run so as to keep the bellows properly filled.

To these ends my invention consists of certain features of construction and combinations of parts, which will be hereinafter described and claimed.

Reference is to be had to the accompanying drawings, forming a part of this specification, in which similar figures and letters of reference indicate corresponding parts in all the views.

Figure 1 illustrates the simplest form of my invention in which the pull cord is arranged to lift the arm of the ordinary rheostat against the weight which is secured to the arm. Fig. 2 is a diagrammatic view, showing, in connection with the pull cord, a switch mechanism adapted to control the electric supply to the motor. Fig. 3 is a detail sectional view of the armature lever used in connection with the switch mechanism; and Fig. 4 is a perspective view, partly in section, showing the arrangement of the dash pot and piston for preventing the too rapid movement of the switch rod.

The motor 10 may be of any approved kind and, as illustrated in Fig. 1, a switch 11 is used for turning electricity on and off the motor, this switch being an ordinary snap switch connected with the motor or line wires A and A'. From the switch leads a wire $a$ connecting with the field and armature of the motor on one side, and other wires $a'$ connect with the opposite field and armature of the motor and also with the rheostat 12 which is not shown in detail, as it is like the rheostat ordinarily used for this purpose. The rheostat has a swinging arm 13 adapted to successively touch the contacts 14, and thus control the amount of resistance which is cut into or out of the motor circuit.

The rheostat is arranged so that when the arm 13 touches the upper contact, the current will pass through all the resistance in the box or rheostat, but when it drops to the next contact, part of the resistance will be cut out and so on down to the lower contact, when the current will pass directly through the rheostat without meeting with resistance and so cause the motor to run at full speed.

To the arm 13 is pivoted a depending connecting rod 15, which has at its lower end a weight 16, sufficiently heavy to cause the arm 13 to drop normally to the lower contact on the rheostat, and this weight rides on the bellows 17 so that when the bellows is filling the weight and rod move upward and push up the arm 13, thus cutting in resistance and decreasing the speed of the motor, while if the bellows is being emptied the weight carries down the arm and increases the speed of the motor. All the above arrangement is substantially like that in common use, and I do not claim it as my invention.

As above remarked another rheostat or starting box is usually employed in connection with the one described, but I do away with this entirely by the use of a pull cord 18 which connects with the arm 13, extends over a suitable guide pulley 19 or as many pulleys as may be necessary, and finally terminates in a knob 20 which can be easily reached by the organist as he plays the organ, and this knob, when arranged opposite a partition through which the cord extends, prevents the cord from being pulled through in the wrong direction.

When the organist has finished playing he turns off the snap switch and pulls out the knob 20 as far as it will go and fastens it in some convenient way. The pulling out of the knob 20 pulls up the arm 13 of the regulator above the contacts 14 to the position shown by dotted lines on the rheostat, and consequently the weight 16 will be suspended above the bellows 17. When the motor is to be started again it will be seen that, by turning the switch 11, the current is turned on to the motor field, passing through the wires $a'$ and $a$, but the arm 13 will normally be a little above the first upper contact on the rheostat, (see dotted lines on rheostat,) and the current will not pass through the rheostat to the armature of the motor until the cord is loosed; and when this is done the arm 13 is lowered, meeting the contacts 14 and thus setting the motor in operation and after it is once started it is self-regulating by means of the rheostat and bellows connection described above. This arrangement of the pull cord is the simplest form of the invention, and it will be understood that a rod, cable, or any other similar affair may be substituted for the cord with the same effect. It is preferable, however, to use a switch which is automatically operated by the pulling of the cord, and this I provide for in the construction and arrangement illustrated in Figs. 2 and 4. As here illustrated, the cord 18 is connected to a pull or switch rod 21, which has the knob 20 at its outer end which slides in a partition 22 which may represent any suitable support around the organ.

The switch rod 21 is provided with contact collars 23 and 24, which are of conducting material, one being inside the partition and the other outside, and these collars are adapted to contact with the rigid contacts 25 and 26 which are insulated on the partition 22 and may be countersunk therein, or extended out, as shown by dotted lines at $25^a$. These contact collars control the current through the magnets 27 and 28 which operate the switch, the magnet 27 being connected by a wire $b$ with one of the contact points $28^a$, $28^b$, which connect with the line wires A and A', and from this magnet 27 leads a wire $b'$ to the contact 25 and another wire $b^2$ leads from the contact 25 to the wire A'. The contacts 29 and $29^a$ are arranged opposite the contacts $28^a$ and $28^b$, so that the several contacts may be electrically connected, as hereinafter described, and the contact 29 is in connection with the magnet 28 by means of a wire $c$, while another wire $c'$ leads from the magnet 28 to the contact 26 and a wire $c^2$ leads from the contact 26 back into connection with the contact $29^a$. The contacts $29^a$ and 29 are in connection with the motor and rheostat, a wire B leading from the contact 29 to the rheostat, while a wire B' leads from the wire B to the field of the motor, a wire $B^2$ from the rheostat to the armature of the motor, and a wire $B^3$ from the field and armature to the contact $29^a$.

The magnets 27 and 28 have, between them, an armature 30 which is secured to an armature lever 31 which is fulcrumed below the magnet cores on a pin 32 or equivalent device and at its upper end the lever has contact plates 33 which are adapted to engage the contacts $28^a$, $28^b$, 29 and $29^a$.

To start the motor the knob 20 is pulled out until the collar 23 strikes the contacts 25 and this energizes the magnet 27, the current passing from the contact $28^a$, through the wire $b$, the magnet 27, the wire $b'$, the contacts 25, the collar 23 and the wire $b^2$, back to the wire A'. This causes the magnet 27 to pull the armature 30 and the lever 31 over so as to throw the contact plates 33 into engagement with the contacts $28^a$, $28^b$, 29 and $29^a$, and the motor is thus started, the current passing from the wire A, through the contact $28^a$, one of the contact plates 33, the contact 29, through the wire B, a portion of the current passing through the wire B', to the field of the motor while the current passes also through the wire B and the rheostat and through the wire $B^2$ to the armature of the motor, and from the motor the current passes back through the wire $B^3$ to the contact $29^a$, through the other contact plate 33 to the contact $28^b$ and the wire A'. The rod 21, on being pulled out, raises the contact arm 13 a little above the upper contact 14 of the rheostat so that the field of the motor is well charged before the contact arm engages the upper contact of the rheostat. To shut off the motor, the switch rod 21 is pushed in until the contact collar 24 strikes the contacts 26 and this cuts in the magnet 28, the current passing from the wire B through the wire $c$, the magnet 28, the wire $c'$, the contacts 26 and collar 24, and the wire $c^2$ back to the wire $b^3$ which is in circuit, as above described, and the magnet 28, being energized, pulls the armature 30 and lever 31 over to the position shown in Fig. 2, thus cutting out the motor and also cutting out the magnet 28 itself.

There is no danger of the weight 16 dropping far enough to pull the arm 13 off the lower contact 14 and drawing the collar 24 against the contacts 26 so as to shut off the motor current, as the parts are arranged so that when the bellows is empty the collar 24 will not quite touch the contacts 26, as shown in Fig. 2, it is therefore necessary to push in the knob 20 to entirely stop the motor.

To prevent the weight 16 and arm 13 from dropping too suddenly when the switch rod is pulled inward, by the tension of the weight 16, a dash pot 34, shown in Fig. 4, is used, and the rod 21 extends through this and is provided with a piston 35 which fits closely in the dash pot and so checks the inward movement of the rod. The dash pot is of the ordinary kind and provision is made for the escape of air when the piston is pulled outward with the rod. Above the dash pot is a small case or box 37 in which the switch mechanism above described is preferably located.

It will be readily seen from the above description that the pull knob 20 may be arranged within easy reach of the organist, and by simply pulling it out the motor may be properly started and will then be controlled in the ordinary way by the regulating rheostat, and by simply pushing in the rod, the motor will be quickly stopped.

Having thus described my invention, I claim as new and desire to secure by Letters Patent—

1. In an apparatus of the kind described, the combination, with the motor, the single rheostat arranged in the motor circuit, and the automatically operated weighted rheostat arm, of the pull knob operatively connected with the arm to raise it against the weight and thereby render it operative by hand as well as automatically, substantially as described.

2. The combination, with the motor, the single rheostat and the automatically operated weighted arm thereof, of the pull rod adapted to raise the arm against the tension of its weight and thereby render it operative by hand as well as automatically, and a switch actuated by the pull rod and arranged to cut the motor in and out of circuit, the switch being in the position of non-resistance when the motor is stopped, substantially as described.

3. The combination, with the motor, the rheostat and the weighted arm thereof, of the pull rod connected with the weighted arm, magnets arranged in a circuit controlled by the movement of a pull rod, an armature lever movable between the magnets, and means for making and breaking the motor circuit by the movement of the said lever, substantially as described.

4. The combination, with the motor, the rheostat, and the weighted arm thereof, of the pull rod having contact collars thereon, a pair of magnets, contacts in the paths of the pull rod, collars in circuit with the magnets and a source of electric supply, an armature lever hung between the magnets, and means for making and breaking the motor circuit by the movement of the lever and also for cutting out one of the magnets by the said movement, substantially as described.

5. The combination with the motor, the single rheostat arranged in the motor circuit, and the weighted automatically operated rheostat arm, of pull rod operatively connected with said arm to raise it against the weight and thereby render it operative by hand as well as automatically, a piston on the rod and a dash pot encircling the piston the said piston and pot retarding the inward movement of the rod but allowing it free outward movement, substantially as described.

JOSEPH F. SHEAHAN.

Witnesses:
JAMES D. LEMON,
THOMAS J. DONLOU.